(No Model.)  4 Sheets—Sheet 1.

N. W. HOLT.
SEPARATING MACHINE.

No. 417,676.  Patented Dec. 17, 1889.

(No Model.) 4 Sheets—Sheet 2.
N. W. HOLT.
SEPARATING MACHINE.

No. 417,676. Patented Dec. 17, 1889.

(No Model.) 4 Sheets—Sheet 3.
N. W. HOLT.
SEPARATING MACHINE.

No. 417,676. Patented Dec. 17, 1889.

Witnesses:
Chas. J. Buchheit
Emil J. Neuhart

Noah W. Holt, Inventor.
By Wilhelm Bonner
Attorneys.

(No Model.) 4 Sheets—Sheet 4.

N. W. HOLT.
SEPARATING MACHINE.

No. 417,676. Patented Dec. 17, 1889.

Witnesses:
Chas. J. Buchheit
Emil J. Neuhart

Noah W. Holt  Inventor
By Wilhelm Bonnet
Attorneys

UNITED STATES PATENT OFFICE.

NOAH W. HOLT, OF MANCHESTER, MICHIGAN.

SEPARATING-MACHINE.

SPECIFICATION forming part of Letters Patent No. 417,676, dated December 17, 1889.

Application filed October 30, 1889. Serial No. 328,635. (No model.)

*To all whom it may concern:*

Be it known that I, NOAH W. HOLT, a citizen of the United States, residing at Manchester, in the county of Washtenaw and State of Michigan, have invented a new and useful Improvement in Separating-Machines, of which the following is a specification.

This invention relates to that class of separating-machines in which the separation is effected by an ascending air-current, which removes the light material while the heavy material descends, and in which this dust-laden air-current is freed from the solid particles which it contains in a dust-collector, from which the purified air is returned to the separator, so that a continuous circulation of air is maintained within the machine.

The object of my invention is to produce a machine in which the dust-laden air is freed from the solid particles by centrifugal force, and in which the air is admitted to the separator more evenly than heretofore, thereby improving the operation of separating the light particles from the heavy material, as well as the operation of collecting the dust and purifying the air.

Figure 1:
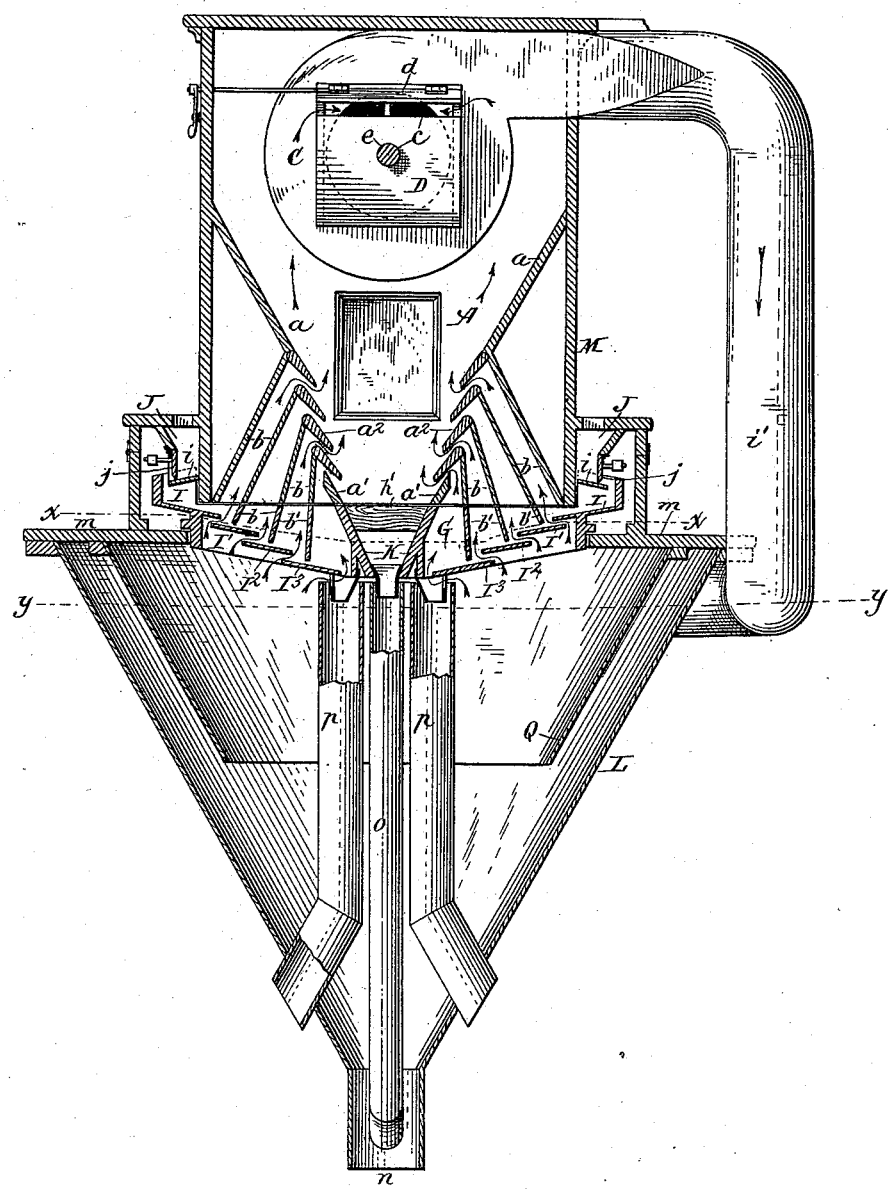
Figure 2:
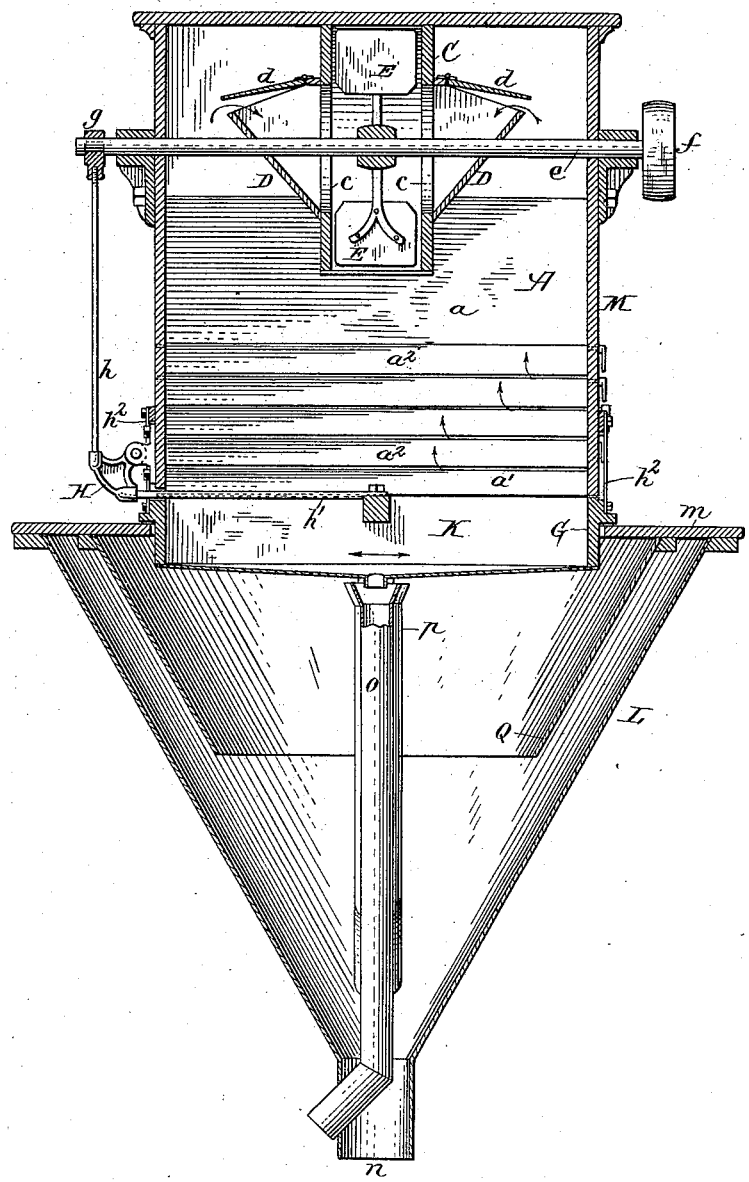
Figure 3:
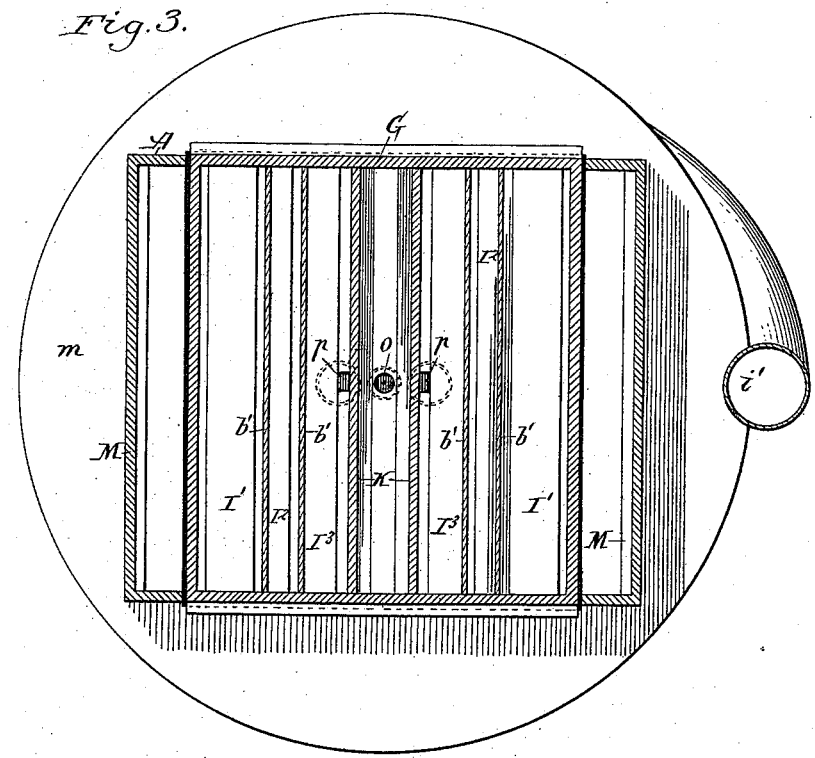
Figure 4:
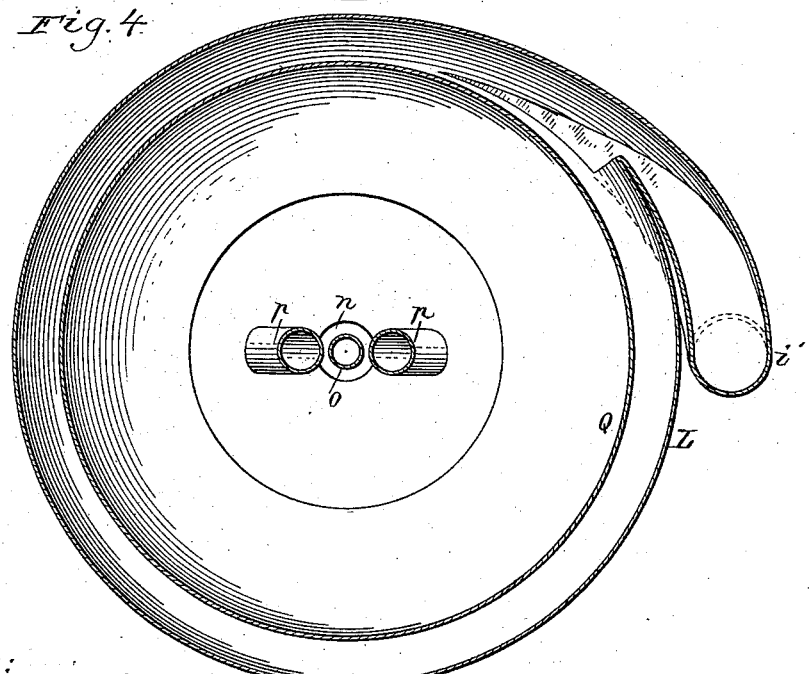
Figure 5:
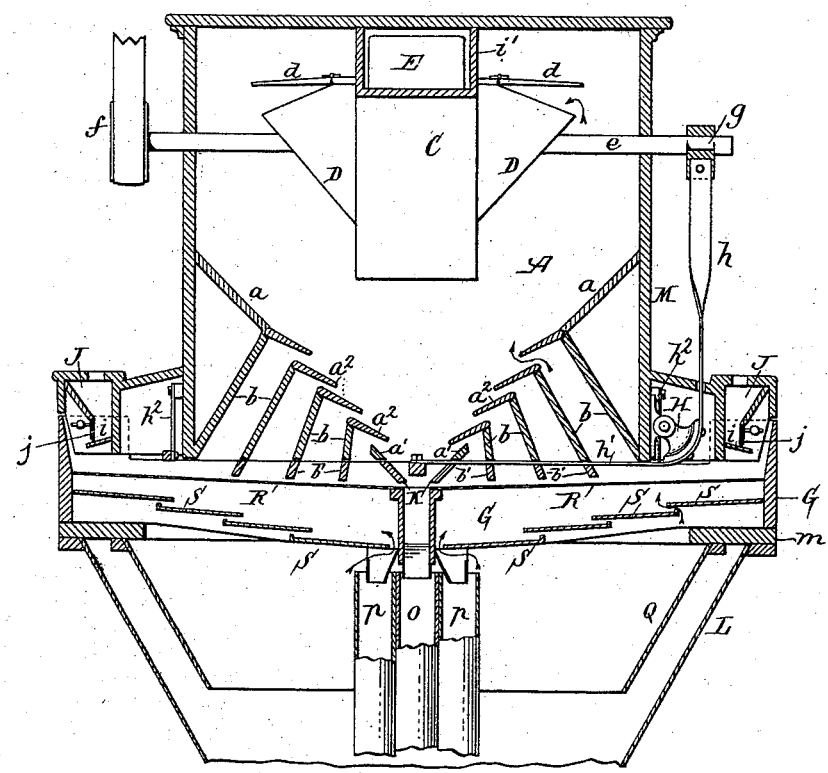
Figure 6:
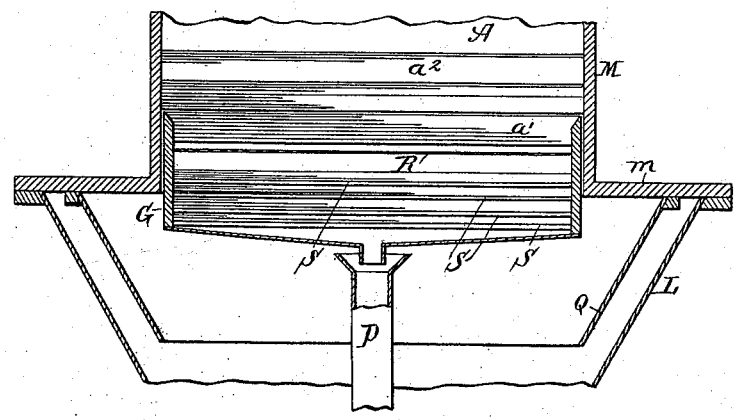

In the accompanying drawings, consisting of four sheets, Figure 1 is a sectional elevation of my improved separating-machine, in which an aspirating-separator is employed. Fig. 2 is a sectional elevation at right angles to Fig. 1. Figs. 3 and 4 are horizontal sections in line $x\ x$ and $y\ y$, Fig. 1, respectively. Figs. 5 and 6 are fragmentary vertical sections, at right angles to each other, of my improved separating-machine, in which a sieve-separator is employed.

Like letters of reference refer to like parts in the several figures.

A represents the exhaust-chamber, which forms the top portion of the machine, and is provided in its lower portion with inclined or cant boards $a\ a'$ and two series of adjustable valves $a^2$, which are arranged on each side of the exhaust-chamber, between the upper cant-board $a$ and the lower cant-board $a'$.

$b$ represents throat-plates extending from the heels of the valves $a^2$ to the lower edge of the exhaust-chamber, so as to form upwardly-converging passages in the exhaust-chamber, through which the air and light material pass upwardly and between the valves into the inner portion of the exhaust-chamber. The space between the cant-boards and valves enlarges upwardly, whereby the force and speed of the ascending air-current are gradually diminished and the heavier particles, which have been carried off with the light dust, are allowed to drop out of the air-current.

C represents the fan-case, which is preferably arranged in the upper portion of the exhaust-chamber, and which is provided in its sides with eyes $c$, through which the dust-laden air is drawn into the fan-case. In order to compel the dust-laden air to rise nearly to the top of the exhaust-chamber, the lower portions of the eyes are covered by oblique shields D, which are surmounted by adjustable dampers $d$. The dust-laden air enters between the shields and the dampers, as indicated by the arrows in Fig. 1. By adjusting these dampers the force of the air-current is regulated. The shields increase the height to which the dust-laden air ascends in the exhaust-chamber, whereby the separation of the heavier particles from the fine dust in the exhaust-chamber is facilitated and rendered more complete.

E represents the fan-blades secured to a horizontal shaft $e$, which extends through the end walls of the exhaust-chamber, and is provided at one end with a driving-pulley $f$ and at the other end with an eccentric $g$.

G represents a shaker, which is arranged under the exhaust-chamber, and which is actuated from the eccentric $g$ by rods $h\ h'$ and a bell-crank lever H. The shaker is suspended from the exhaust-chamber by flexible hangers $h^2$.

As shown in Figs. 1, 2, 3, and 4, the shaker is provided at opposite ends with feed-boards $i$ and with two series of overlapping inclined shelves I I' I$^2$ I$^3$, which are inclined inwardly, so that the material passes from the feed-board upon the outer and highest shelf I, and then from each shelf upon the next lower shelf until the last and inner shelf is reached.

J represents feed-hoppers, which are arranged above the feed-boards $i$ and provided with suitable feed-gates $j$. The shaker is provided with throat-plates $b'$, which are arranged above the shelves and form downward continuations of the throat-plates $b$. The shaker is further provided with cant-boards K, which are arranged in the middle portion of the shaker, between the two series of shelves, and which form continuations of the lower cant-boards $a'$ in the exhaust-chamber. The motion of the shaker takes place in the longitudinal direction of the shelves, so that the register of the movable portions of the throat-plates and cant-boards, which are secured to the shaker, with the stationary portions, which are secured to the exhaust-chamber, is not effected by the movement of the shaker.

L represents the tapering shell or peripheral wall of the centrifugal dust-collector, which is arranged below the separator, and which receives the dust-laden air at its upper and large end tangentially from the blast-spout $i'$ of the fan, which penetrates the side wall of the exhaust-chamber and extends downwardly therefrom to the upper end of the dust-collector.

$m$ is the head which covers the large end of the shell L, and upon which the exhaust-chamber A is supported by the casings M, which inclose the feed-hoppers at both ends of the shaker.

$n$ represents the dust-discharge spout at the small end of the tapering shell L. $o$ is a central discharge-spout which receives the heavier particles deposited in the exhaust-chamber, and $p\,p$ two discharge-spouts which receive the purified material from the two series of shelves. The lower ends of these spouts extend through the inclosure of the dust-collector and discharge outside of the same into convenient receptacles.

Q represents a downwardly-tapering shield or guard arranged in the upper portion of the dust-collector, at a suitable distance from the peripheral wall thereof, so as to compel the whirling body of air to move downwardly into the body of the separating-chamber of the dust-collector before the air is permitted to ascend to the shaker, thereby insuring the thorough removal of all solid particles from the air before it is again admitted to the separating apparatus above the dust-collector.

The material to be separated is fed into the feed-hoppers and passes thence upon the shelves of the shaker, over which it flows in thin streams of uniform thickness. In descending from one shelf to the other the stream of material encounters an ascending air-current, which removes the light material, while the heavy material moves on from shelf to shelf and passes, finally, purified into the discharge-spout $p$. The air-currents passing upwardly from the shelves carry the light material through the throats between the plates $b$ and through the narrow spaces between the valves into the enlarged central space in the exhaust-chamber. The air-currents expand here and drop the heavier grade of light material, which descends over the valves and cant-boards, into the central discharge-spout $o$, while the light dust is carried by the air-current into the fan-case, and thence into the dust-collector. The air-current enters the dust-collector tangentially, whereby the dust-laden air is caused to whirl in the same. This causes the dust particles to be deposited against the peripheral wall of the dust-collector on which the material moves toward the discharge-spout at the small end, through which it escapes, while the purified air moves inwardly toward the axis of the dust-collector and ascends within the tapering shield Q toward the shaker and the exhaust-chamber. The whirling motion of the air in the dust-collector distributes the air over the entire lower surface of the shaker, whereby the action of the air is rendered even and uniform upon the material flowing over the shaker. This improves the separating action and increases the separating capacity of the shaker, so that when the machine is used for purifying middlings a larger proportion of the fluff or light impurities is removed.

By providing the shaker with two separate feeding devices and two separate discharges for the purified material the machine is enabled to operate upon two different grades or kinds of material at the same time, discharging each purified product separately, but delivering the separated heavy dust or "cut-off" material through the central spout and the separated fine dust from the dust-collector of both grades together. By means of the valves $a^2$ the air-currents passing through each grade of material can be regulated to the requirements of that material. These valves afford a complete control over the air-currents, so that when the machine is used for purifying middlings no sharp middlings are carried off to the fan, but whatever inconsiderable amount of sharp middlings is lifted off with the dust is deposited with the cut-off material in the central space of the exhaust-chamber and prevented from passing to the dust-collector.

The machine is very simple and compact, takes up little space, requires little power for its operation, and is dustless, as it does not discharge any air. It contains no conveyers or other contrivances which wear or pulverize the middlings, but leaves them intact and in good condition.

In the modified construction of the machine represented in Figs. 5 and 6 the shaker is provided with two sieves R R, over which the material to be separated flows. The tailings from both sieves pass, together with the cut-off material, from the exhaust-chamber into the central spout $o$, while the purified material, which passes through the sieves, falls on overlapping shelves S, between which the air passes upwardly to the exhaust-chamber, and by which the purified material is conducted to the discharge-spouts $p\,p$. These sieves are preferably provided with cloth-cleaning devices of any well-known or suitable construction.

I do not wish to claim in this application any processes or specific constructions which are claimed in any of my pending applications, filed as follows: Serial No. 271,134, filed April 9, 1888; Serial No. 272,033, filed April 27, 1888; Serial No. 279,047, filed July 5, 1888; Serial No. 289,248, filed October 26, 1888; Serial No. 296,349, filed January 11, 1889, and Serial No. 305,716, filed April 2, 1889.

I claim as my invention—

1. The combination of a dust-separating chamber, means whereby the air is caused to rotate within said separating-chamber, a shaker arranged over the air-outlet of said separating-chamber, and an exhaust-chamber arranged above said shaker, substantially as set forth.

2. The combination of a dust-separating chamber, a shaker arranged over the air-outlet of said separating-chamber, an exhaust-chamber arranged over said shaker, and a fan having its eye connected with said exhaust-chamber and its blast-spout connected tangentially with the dust-separating chamber, substantially as set forth.

3. The combination of a dust-separating chamber, a shaker arranged over the air-outlet of said separating chamber, an exhaust-chamber arranged over said shaker, a fan having its eye connected with said exhaust-chamber and its blast-spout connected tangentially with the dust-separating chamber, and a shield arranged within said dust-separating chamber, between the blast-spout and the shaker, substantially as set forth.

4. The combination of a dust-separating chamber, means whereby the air is caused to rotate within said separating-chamber, a shaker arranged over the air-outlet of said separating-chamber, an exhaust-chamber arranged over said shaker, and a feeder arranged over the shaker outside of the exhaust-chamber, substantially as set forth.

5. The combination of a dust-separating chamber, means whereby the air is caused to rotate within said separating-chamber, a shaker arranged over the air-outlet of said separating-chamber and provided with a series of shelves having air-passages between them, and an exhaust-chamber arranged over said shaker, substantially as set forth.

6. The combination of a dust-separating chamber, means whereby the air is caused to rotate within said separating-chamber, a shaker arranged over the air-outlet of said separating-chamber, an exhaust-chamber arranged over said shaker, and throat-plates and valves arranged in the exhaust-chamber, substantially as set forth.

7. The combination of a dust-separating chamber, means whereby the air is caused to rotate within said separating-chamber, a shaker arranged over the air-outlet of said separating-chamber, an exhaust-chamber arranged over said shaker, throat-plates and valves secured in the exhaust-chamber, and extensions of the throat-plates secured to the shaker, substantially as set forth.

8. The combination of a dust-separating chamber, means whereby the air is caused to rotate in the same, a shaker arranged over the air-outlet of said separating-chamber and provided with two series of shelves, an exhaust-chamber arranged over the shaker, feeders arranged at opposite ends of the shaker, and separate discharge-spouts for the purified material, substantially as set forth.

9. The combination of the dust-separating chamber, means whereby the air is caused to rotate in the same, a shaker arranged over the air-outlet of said separating-chamber and provided with two series of shelves, an exhaust-chamber arranged over the shaker, feeders arranged at opposite ends of the shaker, two series of throat-plates and valves arranged in the exhaust-chamber over the two series of shelves, a central discharge-spout for the discharge of the material deposited in the exhaust-chamber, and separate discharge-spouts for the material passing over the two series of shelves, substantially as set forth.

Witness my hand this 25th day of October, 1889.

NOAH W. HOLT.

Witnesses:
A. F. FREEMAN,
C. R. KNICKERBOCKER.